ELECTRICAL CONNECTOR FOR PRINTED CIRCUIT BOARDS

Filed July 22, 1963

INVENTOR.
KENNETH H. WHITE

BY

Christie, Parker & Hale
ATTORNEYS.

United States Patent Office 3,289,141
Patented Nov. 29, 1966

3,289,141
ELECTRICAL CONNECTOR FOR PRINTED CIRCUIT BOARDS

Kenneth H. White, West Covina, Calif., assignor to Burroughs Corporation, Detroit, Mich., a corporation of Michigan Filed July 22, 1963, Ser. No. 296,525
3 Claims. (Cl. 339—17)

This invention relates to electrical connectors and it is particularly useful for interconnecting a plurality of small, closely spaced conductors.

As the size of the components in an electronic circuit is reduced, a limiting factor as to area reduction is encountered in the connectors employed. The present connectors are bulky and space wasters compared to the micromodule circuit components that have been developed. Many of the components have been reduced in size to such an extent that any further reduction would be superfluous in view of the space required for the connectors.

Some of the bulkier and more difficult-to-make connections, like solder connections may be done away with by employing spring contacts. However, many of the present connectors designed for use in the micromodule field have an excessively large volume devoted just to the spring element of the contacts.

The problem of size reduction is recognized in many fields. In the missile field, for example, electronic apparatus and the connectors therein have to occupy minimal space because of the weight and space limitations. In the computer field, the circuit components are made as small as possible and the circuits are placed close together to reduce the electrical path length and to increase the speed of operation. However, the smallness of the conductors and the close proximity thereof on very thin circuit boards place exacting requirements on the selected connectors. An example of the problem in the computer art is a presently employed thin-film memory. The memory is attached to a rectangular circuit board 0.025 inch thick with as many as 20 or more conductors per inch terminating at an edge on both the top and bottom surfaces thereof. It is apparent that the connector used for such a device will be restricted in both its conductor size and its conductor spacing.

Additionally, when numerous conductors are located on a flat surface, such as a circuit board, it is very difficult, if not impossible to have all of the conductors at the same height. The resulting irregularities in height further complicate the making of a positve connection to each conductor of the circuit board.

It is desirable that the connections be readily disconnectable for maintenance purposes, for economy of repairs and also for possible circuit changes. Thus, the connector should not only occupy a minimal space but should also be disconnectable. Additionally, it is desirable that the connector compensate for any irregularities in conductor height while providing exactitude of conductor positioning.

Therefore, in accordance with the present invention, a connector for microcircuits comprises a laminated connector board having conductors on at least one surface which are spaced identical to the conductors on the circuit boards to be interconnected. The laminae include a first outside layer of insulating substrate to which the conductors are attached. Next to the insulating substrate is a layer of resilient material, which absorbs any irregularities in circuit board flatness and aids in the compensation of any irregularities in the height of the conductors. The other outside layer of the connector board comprises a solid material, which may also be composed of an insulating material with conductors attached thereto. The presence of conductors on this outside layer is determined by the position of the connector in the connection when a plurality of circuit boards are stacked. After the circuit boards and their connectors are stacked, or two circuit boards are placed between two connector boards, a force is applied to the top and bottom connector boards to squeeze the connector boards and the circuit boards together.

Additionally, the conductors on the connector board advantageously include a raised area at both ends of each conductor to provide a concentrated unit force on the conductors of the circuit boards when the squeezing or sandwiching force is applied to the connectors. The raised areas will also aid in the compensation of the height irregularaties of the conductors.

These and other features and advantages of the present invention will be understood more clearly and fully upon consideration of the following specification and drawing in which.

Figure 1:
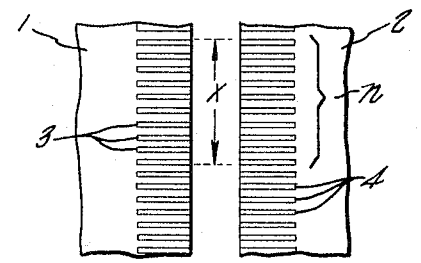
FIG. 1 is a pictorial diagram of circuit boards to be interconnected.

In FIG. 1, there is shown a plurality of conductors which are to be interconnected and which terminate at a first common line and a second common line. These conductors may be attached to micromodular circuits which are designed to occupy the smallest space possible. In such a design, there may be as many as 20 or more conductors per inch along the common line or edge. In FIG. 1, it is assumed that the plurality of conductors are attached to a circuit board 1 and a circuit board 2. On circuit board 1 there is a plurality of conductors 3 and on circuit board 2 there is a plurality of conductors 4. For illustrative purposes, it is assumed that in a unit length $x$, along the edge of the circuit boards, there are $n$ conductors.

Figure 2:
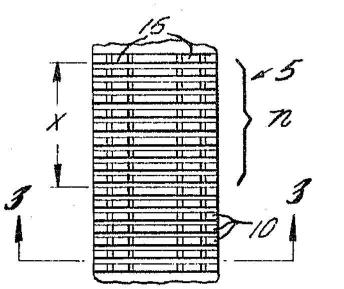
FIG. 2 is a pictorial diagram of a connector for circuit boards having small, closely spaced conductors terminating at the edges, in accordance with the invention.

The circuit boards 1 and 2 of FIG. 1 may be of any thickness. However, when each top conductor is paired with a bottom conductor to form a strip transmission line, the circuit board must be sufficiently thin to place the conductors in close proximity. When the circuit boards are very thin and have a plurality of conductors in a limited area as shown in FIG. 1, there are no commercial connectors which will readily interconnnect the circuit boards. Therefore, in accordance with the invention, the connector 5 of FIG. 2 is employed to interconnect the circuit boards of FIG. 1. It is noted that, when the circuit boards have conductors on both surfaces, two connector boards will be required, one to interconnect the conductors of the top surfaces and the other to interconnect the conductors on the bottom surfaces.

The connector 5 of FIG. 2 comprises a laminated rectangular board having the same number of conductors $n$ in a unit length $x$ as do the circuit boards to be interconnected. The laminated construction of the connector board 5 is shown in a cross-sectional view in FIG. 3. The laminae of the board include a layer of insulating material 11, a layer of resilient material 12 and another layer of insulating material 13. The resilient material 12 is located between the insulating layers 11 and 13. The conductors 10 are attached to the outside surface of the insulating layer 11 and conductors 14 are attached to the outside surface of layer 13. These conductors may be etched onto or pressed into or in some way attached to the boards, by employing one of the ways that are well known in the art.

Figure 3:
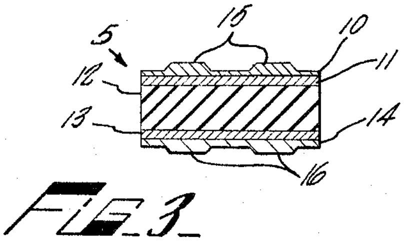
FIG. 3 is a cross-sectional view of the connector along the line 3—3 of FIG. 2.

The connector 5 of FIG. 3 is shown as including conductors attached to both insulating layers 11 and 13. However, if the connector is to be employed as an outside connector, when the circuit boards are stacked or there are only two circuit boards to be interconnected, there will not be conductors attached to both layers. In that case, the outside layer, which does not have the conductors attached thereto, need not be made of an insulating material. This layer, however, must be rigid enough to withstand the application of a sandwiching or squeezing force which is applied to make the connection.

It is seen in FIG. 3 that the conductors 10 and 14 include a raised area 15 and 16, respectively, near both ends. The raised areas of the conductors touch the conductors of the circuit boards to be interconnected. By including these raised areas, it is possible to impart a higher unit force at each contact to insure a more positive connection and to aid in overcoming any irregularities in the conductor heights.

These raised areas may be formed by masking the ends and the middles of the conductors 10 and 14 and plating up the exposed area by an electroforming process. On the other hand, the raised areas may be formed by beginning with a circuit board having a sheet of copper of a thickness equal to the desired height of the raised areas. The conductors are then etched by removing the copper in the area between the conductors and reducing the copper around the raised area down to the height desired for the conductors. Additionally, the conducting material may be removed completely between the raised area and circuit components connected therebetween. This would permit a part of the circuit to be attached to the connector board.

When the circuit boards 1 and 2 of FIG. 1 are to be interconnected, the edges at which the conductors terminate will be placed adjacent to each other. The connector board 5 of FIG. 2 will then be placed on top of the circuit boards where the terminating edges are contiguous so that the conductors of the connector board will make contact with and interconnect the conductors of the circuit boards. A typical interconnection is shown in FIG. 4 wherein, for illustrative purposes, it is assumed that the application requires the stacking of a plurality of circuit boards.

Figure 4:
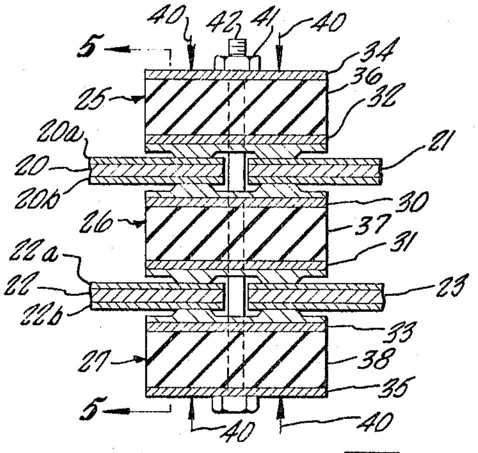
FIG. 4 is a pictorial diagram of the connection of a plurality of stacked circuit boards, in accordance with the invention.

The connection of FIG. 4 includes two sets of circuit boards which are to be interconnected. The first set comprises circuit boards 20 and 21 and the second set comprises circuit boards 22 and 23. The upper conductors of circuit boards 20 and 21 are interconnected by a connector 25 and the lower conductors of the circuit boards are interconnected by connector 26. Connector 26 also interconnects the upper conductors of the circuit boards 22 and 23. The lower conductors of circuit boards 22 and 23 are interconnected by a connector 27.

The intermediate connector 26 has conductors attached to both outside layers 30 and 31, while connectors 25 and 27 have conductors attached to only one outside layer 32 and 33, respectively. The outside layers 34 and 35 of connectors 25 and 27, respectively, are of a rigid material and have the sandwiching or squeezing force, which is represented by the arrows 40, applied thereto. The sandwiching force may typically be in the form of a nut and bolt supported by large nonresilient washers on both the top and bottom surfaces. Thereafter, tightening of the nut will squeeze the boards together.

The sandwiching or squeezing force, applied in the direction depicted by arrows 40, is applied to the stack of connectors in series. This force may be in the form of a nut 41 and bolt 42, as shown in FIG. 4, or in any other suitable form. Thereafter, the layer of resilient material of each connector, for example, layers 36, 37 and 38 of connectors 25, 26 and 27, respectively, will distribute this force in parallel to each conductor of its associated connector board. Thus, rather than having a separate spring or connecting force for each contact, a single force is applied for all contacts.

The intermediate connector 26 need not be a single connector, as shown, but could comprise two connectors like connector 25. Thereafter, the layers which have no conductors attached would be placed in contact with each other. This would permit the separate connection of two circuit boards before any stacking takes place. These circuit boards could subsequently be stacked and a single force applied.

Figure 5:
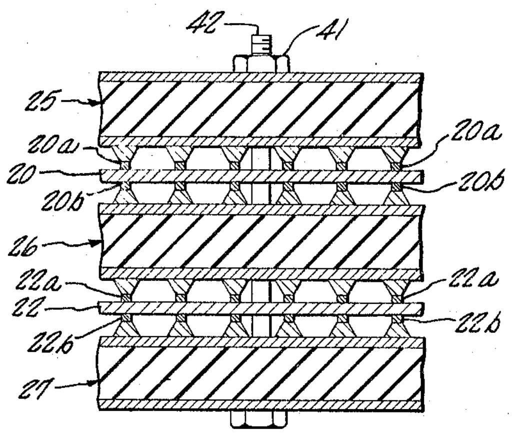
FIG. 5 is a cross-sectional view of the interconnection shown along the line 5—5 in FIG. 4.

A cross-sectional view of the connection of FIG. 4 is shown in FIG. 5 to illustrate more clearly the spacing of the conductors along the circuit boards and connectors. For each conductor 20$a$ and 20$b$ and each conductor 22$a$ and 22$b$ on the circuit boards 20 and 22, respectively, there is a conductor attached to the connectors 25, 26 and 27. It is noted that the size and spacing of the conductors shown in the drawing are only illustrative and are not in any way limiting.

The connector boards may be advantageously employed when the circuit board to be connected has small, closely spaced conductors terminating at more than one edge. For such a connection, the connector board will have the same configuration as the circuit board but will have a larger surface area.

Figure 6:
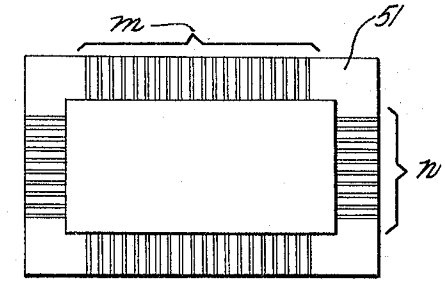
FIG. 6 is a pictorial diagram of a circuit board having conductors terminating at more than one edge.

For example, in the computer art, thin-film memories are placed on rectangular circuit boards which have conductors terminating at each edge on both the top and bottom surfaces. Such a circuit board is shown in FIG. 6. Along two edges of the circuit board 51 there are $m$ conductors terminating and at the other two edges there are $n$ conductors.

Figure 7:
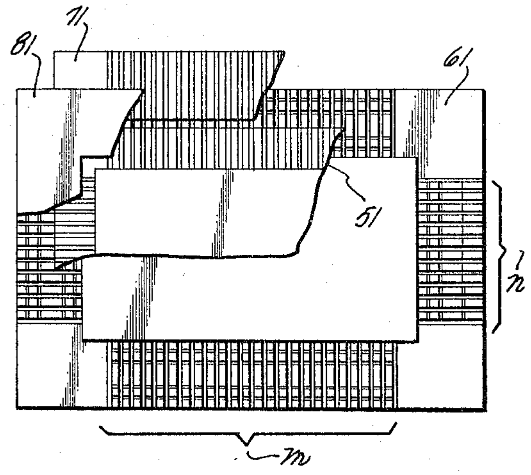
FIG. 7 is a pictorial diagram of a connector for connecting external circuit boards to a circuit board having conductors terminating at more than one edge.

The connector board for the circuit board of FIG. 6 is shown in FIG. 7. A connector board 61 has the same configuration as the circuit board 51 and additionally has a larger surface area. The conductors around the periphery of the connector board 61 are the same size and are spaced identical to the conductors of the circuit board 51, which is to be connected to other circuit boards.

A circuit board 71, to which one group of the conductors terminating at one edge of circuit board 51 is to be connected, is shown in the position for connection in FIG. 7. There will be similar circuit boards placed on the other three sides of the rectangular circuit board 51.

To complete the connection of the circuit board 51, another connector board 81 is placed on top of the circuit board 51. This connector board 81 is identical to the connector board 61 and interconnects the conductors on the opposite surface of circuit board 51 and the adjacent circuit boards to which circuit board 51 is connected. This additional connector board is necessary because of the conductors on both surfaces of circuit board 51.

The use of a connector board having the same configuration as the circuit board to be connected permits a fixed relative position of the conductors around the connector board to insure the proper contact with each conductor of the circuit board. Thereafter, the external sandwiching force will be applied to complete the connection.

What is claimed is:

1. In combination, at least one thin circuit board having a rectangular configuration with $n$ parallel conductors terminating at opposite edges of the rectangle on both the top and bottom surfaces and $m$ parallel conductors terminating at opposite edges of the rectangle on both the top and the bottom surfaces, a plurality of thin circuit boards having $n$ parallel conductors terminating at one edge on both the top and the bottom surfaces of the board, a plurality of circuit boards having $m$ parallel conductors terminating at one edge on both the top and the bottom surfaces of the board, the *n* conductors of the rectangular circuit board and the conductors of the plurality of circuit boards having *n* conductors being of equal width and spaced at equal intervals, the *m* conductors of the rectangular circuit board and the conductors of the plurality of circuit boards having *m* conductors being of equal width and spaced at equal intervals, a connector board having a rectangular configuration of larger dimensions than the rectangular circuit board, the connector board having *n* parallel conductors terminating at opposite edges, the *n* parallel conductors being of sufficient length to extend from the *n* conductors on the rectangular board to the *n* conductors on the circuit boards when a circuit board is placed adjacent to one edge of the rectangular circuit board, the *m* parallel conductors of the connector board being of sufficient length to extend from the *m* parallel conductors on the rectangular circuit board to the *m* parallel conductors on the circuit boards when a circuit board is placed adjacent to the terminating edge of the *m* parallel conductors of the rectangular circuit board, a connector board located on top of each rectangular circuit board and overlapping onto an adjacent circuit board, the *n* parallel conductors of the connector board interconnecting the *n* parallel conductors of the rectangular circuit board and the adjacent circuit board, the *m* parallel conductors of the connector board interconnecting the *m* parallel conductors of the rectangular circuit board and the *m* parallel conductors of the adjacent circuit board, and means for applying pressure to the outside connector boards to insure the positive connection between the conductor contacts.

2. A micromodule package connector for a plurality of circuit boards comprising a first outside connector board for interconnecting conductors located on one surface of a first circuit board and a parallel surface of a second circuit board of a first pair of circuit boards, said first connector board having conductors equal in number and positioned corresponding to the conductors on the first and second circuit boards to be interconnected, a second outside connector for interconnecting conductors located on one surface of a third circuit board and a parallel surface of a fourth circuit board of a second pair of circuit boards, said second connector board having conductors equal in number and positioned corresponding to the conductors on the third and fourth circuit boards to be interconnected, at least one intermediate connector board for interconnecting conductors located on parallel surfaces of the first pair of circuit boards and for interconnecting conductors located on parallel surfaces of the second pair of circuit boards, the intermediate connector boards having conductors attached to at least one outside surface, said conductors attached to the outside surface being positioned corresponding to the conductors on the circuit boards to be interconnected, and means for applying forces to the first and second outside connector boards for sandwiching the circuit boards between the connector boards, whereby any number of circuit boards are interconnected by one force.

3. A micromodule package connector in accordance with claim 2 wherein the outside connectors comprise 3 layers of substrate, the intermediate layer being of resilient material.

References Cited by the Examiner

UNITED STATES PATENTS

| | | | |
|---|---|---|---|
| 2,703,854 | 3/1955 | Eisler | 229—17 X |
| 2,748,364 | 5/1956 | Kamm | 339—17 |
| 2,881,404 | 4/1959 | Kamm | 339—17 |
| 2,898,522 | 8/1959 | Handen | 339—17 X |
| 2,968,016 | 1/1961 | Angele | 339—17 X |
| 3,002,169 | 9/1961 | Kamm | 339—18 |
| 3,026,494 | 3/1962 | Andersen et al. | 339—17 |
| 3,082,327 | 3/1963 | Rice | 317—101 X |
| 3,123,800 | 3/1964 | Phelps et al. | 339—17 X |

EDWARD C. ALLEN, *Primary Examiner.*

ALFRED S. TRASK, BOBBY R. GAY, *Examiners.*